United States Patent

[11] 3,591,135

[72] Inventor  Oren E. Miller
 8126 North Hudson St., Portland, Oreg. 97203
[21] Appl. No. 855,683
[22] Filed Sept. 5, 1969
[45] Patented July 6, 1971

[54] FORM OF GATE VALVE
 4 Claims, 4 Drawing Figs.
[52] U.S. Cl. ................................................. 251/180,
 251/175, 251/314
[51] Int. Cl. ............................................. F16k 5/06
[50] Field of Search ....................................... 251/163,
 174, 175, 177, 183, 185, 288

[56] References Cited
UNITED STATES PATENTS
| 658,975 | 10/1900 | Clancy | 251/177 |
|---|---|---|---|
| 3,269,415 | 8/1966 | Wapner | 251/175 X |
| 3,364,443 | 1/1968 | Stiegler | 251/175 X |
| 3,489,389 | 1/1970 | Kaatz | 251/163 |

Primary Examiner—Harold W. Weakley

ABSTRACT: This invention consists of a cylindrical body having a tubular inlet and outlet extending outward from the longitudinal center thereof, the aforesaid inlet and outlet being diametrically opposite to one another; and a gate in the form of a curved plate being located in the said cylindrical body the curved plate having a spring guide ring at each end thereof; and at right angle to the plate each guide ring being split or cut, thereby providing the rings with two ends and crossbar having one end connected to each ring. There are two crossbars in parallel spaced relation to one another, the ends of the crossbars being connected to the ends of the rings and at right angle to the rings and directly under the aforesaid curved plate; and an L-shaped lever, having an inverted U-shaped clip, integrally formed at one end, the clip being adapted to encompass in part a portion of the two crossbars. The L-shaped lever is connected to a valve shaft that extends through the center of an end plate of the aforesaid cylindrical body, the valve shaft having a hand lever secured to the outer end thereof, for the purpose of opening or closing the valve.

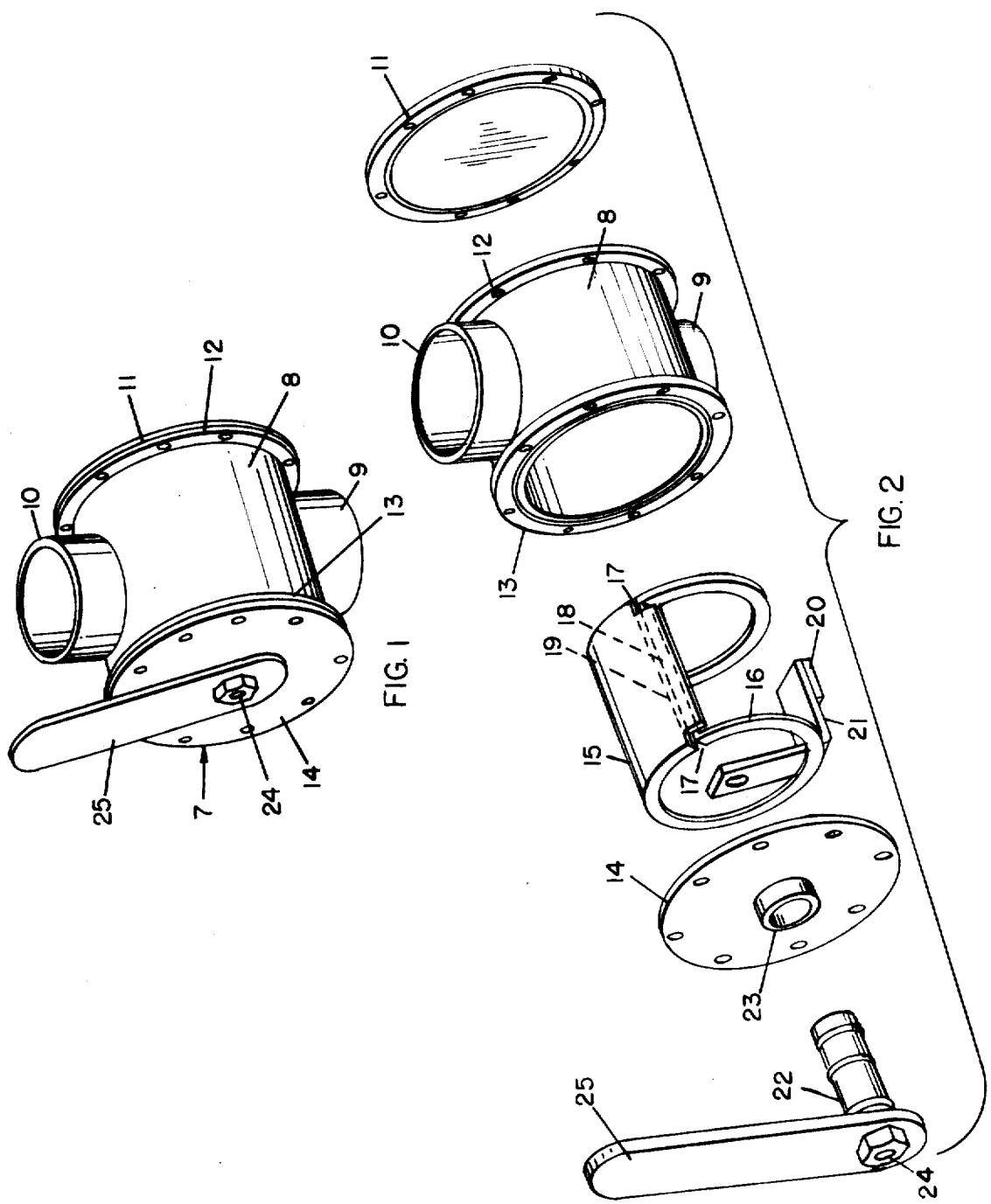
INVENTOR
OREN E. MILLER

*INVENTOR*
OREN E. MILLER

FORM OF GATE VALVE

This invention relates to valves; more particularly, to a gate valve; still more particularly, to an improved form of gate valve. The valve can also be called a rotary valve, although I personally call it a Miller-type valve.

It is the principal object of this invention to provide an improved form of gate valve that has a spring-loaded gate released by internal pressure that is applied by an externally located handle.

Another object of this invention is to provide an improved form of gate valve that is self-seating as well as self-cleaning by reason of its novel construction.

Another object of this invention is to provide an improved form of gate valve that can be rebored on an ordinary lathe by nearly any machinist.

Still another object of this invention is to provide an improved form of gate valve that has a minimum number of parts, (none of which are complicated in configuration), that require a minimum amount of maintenance which can be given by nearly any mechanically inclined person.

Other objects and advantages of this invention will appear hereinafter as the reading of this specification and its appended claims proceeds and the accompanying drawings are examined.

In the drawings:

FIG. 1 is a pictorial view of this invention.

FIG. 2 is a pictorial exploded view of this invention showing its major parts in order of assembly.

Figure 4:
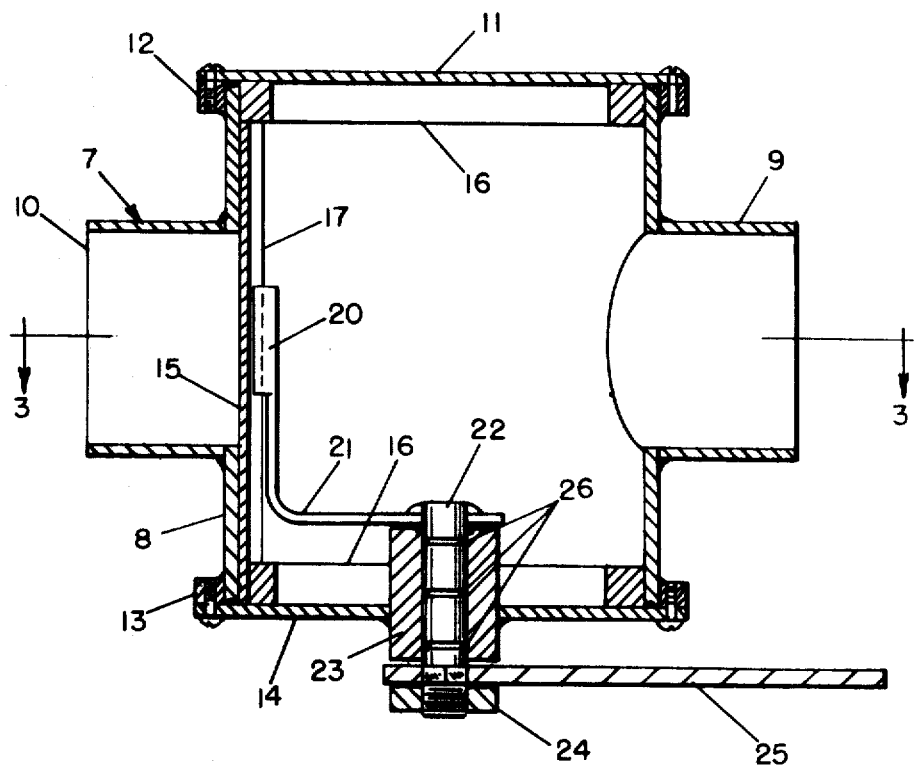
FIG. 4 is a sectional view of this invention, taken substantially along line 4–4 of FIG. 3, and viewed in the direction indicated by the arrows.

In the several views of the drawings, like parts of this invention are indicated by like reference numbers. The reference number 7 indicates this invention in its entirety.

Directing one's attention to FIG. 2 of the accompanying drawings it will be seen that this invention 7 consists of a cylindrical body 8 having an inlet 9 and an outlet 10 in the longitudinal center thereof. The aforesaid inlet and outlet are located diametrically opposite from one another and are in the form of outwardly extending tubes that are at right angle to the aforesaid body 8 with which the tubes are either integrally formed or welded thereto. An end plate 11 is bolted, screwed, or otherwise fastened to the peripheral flange 12 that is made part of one end of the aforesaid cylindrical body 8 which has a similar peripheral flange 13 on the other end of the body, as one can see by looking at FIGS. 1, 2, and 4 of the drawings. A second end plate 14 is suitably secured to this last-mentioned peripheral flange when the various parts of this invention are assembled.

Figure 3:
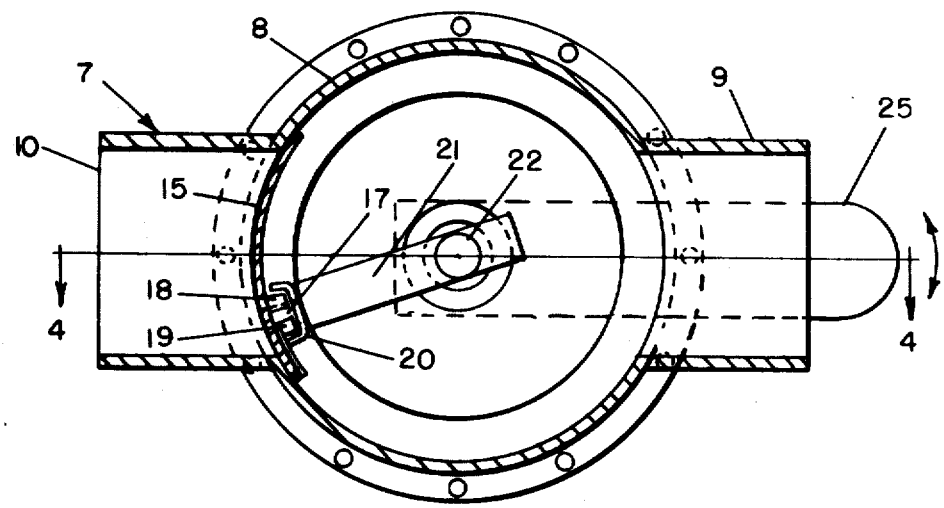
FIG. 3 is a sectional view of this invention, taken substantially along line 3–3 of FIG. 4, and viewed in the direction indicated by the arrows.

Continuing to look at the drawings it will be seen that a curved plate of the same length as the inside of the aforesaid body 8 is located in the body. The curved plate is actually the gate 15 of this invention. Looking at FIG. 2 of the drawings it will be seen that the aforesaid gate 15 has a spring guide ring 16 at each end thereof and at right angle to the aforesaid curved plate. The guide rings 16 are split or cut at 17, thereby providing the rings with two ends. A crossbar 18 has one end connected or otherwise secured to each guide ring 16 while an alike crossbar 19, that is parallel to crossbar 18, is likewise connected or otherwise fastened to the other end of each guide ring 16. This novel construction is clearly shown in FIGS. 2 and 3 of the accompanying drawings. Here, FIG. 3 shows that an inverted U-shaped clip 20 encompasses a portion of each crossbar 18 and 19, the clip 20 being a part of the upper end of an L-shaped release lever 21 that is connected to the inner end of the valve shaft 22 which extends through the center of the hub 23 of the second end plate 14. This part of the invention is best illustrated in FIG. 2 of the drawings. It is also seen here that the outer end of the aforesaid valve shaft 22 is threaded to receive the nut 24 when the hand lever 25 is placed on the end of the shaft. The aforesaid valve shaft 22 is provided with a plurality of spaced O-rings 26 in order to prevent leakage of whatever fluid passes through the valve from leaking past the shaft.

The way in which this invention works will be fully understood by those experienced in the art upon their examination of FIGS. 3 and 4 of the accompanying drawings. However, for those who are not so experienced, attention is focused on FIG. 3 where it can be seen that when the aforesaid hand lever 25 is rotated in either direction, the lever will exert force on one of the aforesaid crossbars 18 or 19 and cause the bar to be drawn towards the other crossbar, thereby releasing the external pressure of the two spring guide rings 16 and thus permitting the gate 15 to be rotated in the cylindrical body 8 and either open or close the inlet or outlet of the valve.

It is to be realized that the aforesaid hand lever 25 can be located at either end of the valve. The valve can be made of any desired material, such as metal fiberglas, plastic or any other material, or the valve can be made of a combination of any two or more materials. The valve can be produced in any desired size and can be provided with a number of outlets, thereby converting it into a distributing valve, if it is so desired. The body of the valve can be made from a casting or fabricated from a number of separately made parts and then welded or otherwise secured together. This valve can be used anywhere valves are needed and can be made to handle any fluid no matter what its composition may be.

This novel valve I have invented is subject to any and all changes in detail design and/or modifications that one may care to make in the same in so long as the changes and/or modifications fall within the scope and intent of the appended claims.

What I now claim as new and desire to secure by Letters Patent is:

1. An improved form of gate valve of the character described, comprising a cylindrical body having an inlet and an outlet, the said inlet and outlet are outwardly extending tubes diametrically opposed to one another and located in the longitudinal center of the said body, and a gate in the form of a curved plate, the said curved plate of the said gate embodies a spring guide ring at each end thereof, the rings being at right angle to the said curved plate and each said ring being split or cut and each end of each ring being connected or otherwise secured to a crossbar located underneath the said curved plate, the two crossbars being parallel to one another, the curved plate is rotated by mechanism connected to a hand lever located on the outside of one end of the said cylindrical body.

2. The invention of claim 1, wherein the said mechanism consists of an L-shaped lever located inside the said cylindrical body and under the said curved plate, the said lever having an inverted U-shaped clip integrally formed on one end thereof, the said U-shaped clip being adapted to encompass in part a portion of the two crossbars, thereby causing the two spring guide rings to be contracted and thus permitting the said gate to be rotated when the said hand lever is moved; and the said hand lever being suitably secured to the outer end of the said valve shaft.

3. The invention of claim 2, wherein the cylindrical body has a solid end plate removably secured to one end thereof; and a second end plate likewise secured to the other end of the said cylindrical body and the second-mentioned end plate being provided with a hub in the center thereof through which is rotatably located the said valve shaft.

4. The invention of claim 3, wherein the said hand lever is secured to the said valve shaft by means of a nut screwed onto the outer end of the said valve shaft which is provided with threads adapted to receive the said nut and the said valve shaft being provided with a plurality of spaced O-rings that prevent any liquid in the said valve from leaking out the end of the said valve.